United States Patent
De Cock et al.

(10) Patent No.: US 10,547,856 B2
(45) Date of Patent: Jan. 28, 2020

(54) CONSTANT-SLOPE BITRATE ALLOCATION FOR DISTRIBUTED ENCODING

(71) Applicant: NETFLIX, INC., Los Gatos, CA (US)

(72) Inventors: Jan De Cock, Cupertino, CA (US); Anne Aaron, Menlo Park, CA (US)

(73) Assignee: NETFLIX, INC., Los Gatos, CA (US)

( * ) Notice: Subject to any disclaimer, the term of this patent is extended or adjusted under 35 U.S.C. 154(b) by 60 days.

(21) Appl. No.: 15/296,580

(22) Filed: Oct. 18, 2016

(65) Prior Publication Data
US 2018/0109799 A1   Apr. 19, 2018

(51) Int. Cl.
*H04N 7/12* (2006.01)
*H04N 19/21* (2014.01)
*H04N 19/184* (2014.01)
*H04N 21/2343* (2011.01)
*H04N 21/845* (2011.01)

(52) U.S. Cl.
CPC .......... *H04N 19/21* (2014.11); *H04N 19/184* (2014.11); *H04N 21/23439* (2013.01); *H04N 21/234354* (2013.01); *H04N 21/8456* (2013.01)

(58) Field of Classification Search
CPC .............. H04N 19/21; H04N 21/8456; H04N 21/23439; H04N 21/234354; H04N 19/184
See application file for complete search history.

(56) References Cited

U.S. PATENT DOCUMENTS

| 8,910,229 B2 | 12/2014 | Xu et al. |
| 9,060,207 B2 | 6/2015 | Scherkus et al. |
| 2008/0084929 A1* | 4/2008 | Li ................. H04N 19/147 375/240.12 |
| 2008/0192738 A1* | 8/2008 | Florencio ............ H04L 1/0014 370/389 |
| 2016/0134881 A1 | 5/2016 | Wang et al. |

FOREIGN PATENT DOCUMENTS

| WO | 2012/078965 A1 | 6/2012 |
| WO | 2013/043923 A1 | 3/2013 |
| WO | 2016/160295 A1 | 10/2016 |

OTHER PUBLICATIONS

International Search Report for application No. PCT/US2017/056902 dated Jan. 30, 2018.

* cited by examiner

*Primary Examiner* — Richard T Torrente
(74) *Attorney, Agent, or Firm* — Artegis Law Group, LLP (57) ABSTRACT

A bitrate allocation engine allocates bitrates for distributed encoding of source data. Upon receiving a chunk of source data, the bitrate allocation engine generates a curve based on multiple points that each specify a different visual quality level and corresponding encoding bitrate for encoding the chunk. Subsequently, the bitrate allocation engine computes an optimized encoding bitrate based on the generated curve and an optimization factor that is associated with different visual quality levels and corresponding encoding bitrates for multiple chunks of the source data. The bitrate allocation engine then causes the chunk to be encoded at the optimized encoding bitrate. Advantageously, the resulting encoded chunk is optimized with respect to the optimization factor for multiple chunks of the source data.

20 Claims, 5 Drawing Sheets

FIGURE 5 ant-slope bitrate allocation
for distributed encoding

BACKGROUND OF THE INVENTION

Field of the Invention

Embodiments of the present invention relate generally to computer science and, more specifically, to constant-slope bitrate allocation for distributed encoding.

Description of the Related Art

Efficiently encoding source data is essential for real-time delivery of video content. To optimize encoding time, distributed encoding processes parallelize the encoding work across multiple compute instances. In one approach to distributed encoding, an encoding subsystem decomposes source data (e.g., a video) into individual source chunks and distributes per-chunk encoding across multiple compute instances. Because the compute instances encode each source chunk independently of and in parallel to the other source chunks, encoding time is optimized. However, because there is no feedback between the compute instances during the per-chunk encoding, globally optimizing encoding decisions across the chunks during the encoding process is difficult. Consequently, conventional approaches for allocating the number of bits used to encode each of the source chunks, also referred to herein as the bitrate, oftentimes result in sub-optimal tradeoffs between bitrate and visual quality.

For instance, in one approach to allocating bitrates, the encoding subsystem computes a single bitrate based on the complexity of the source data. The encoding subsystem then configures the compute instances to apply the bitrate to each of the source chunks. However, in situations where the complexity of the source data differs noticeably between source chunks, the tradeoff represented by the single bitrate can be sub-optimal. More specifically, suppose that the encoding subsystem computes a bitrate based on an average complexity of a simple cartoon, but a particular source chunk includes a detailed action sequence. This computed bitrate results in an under-allocation of bits to the source chunk that includes the detailed action sequence, which causes that chunk of the cartoon to have relatively poor visual quality compared to the other chunks making up the cartoon. Conversely, suppose that the encoding subsystem computes a bitrate based on an average complexity of a detailed action movie, but a particular source chunk includes includes rolling credits. Here, the computed bitrate results in an over-allocation of bits to the source chunk that includes the rolling credits, which takes away resources from the other chunks making up the detailed action movie, such as storage and bandwidth usage, without noticeably increasing overall visual quality of the movie.

To improve the allocation of bits across the different chunks making up source data, some encoding approaches compute a single constant rate factor that represents a target overall level of visual quality. For each source chunk, a compute instance estimates the complexity of each frame included in the source chunk and then allocates the number of bits used to encode each frame based on the estimated complexity and the constant rate factor. Accordingly, encoding based on this type of constant rate factor typically results in visual qualities across chunks that are more uniform compared to visual qualities across chunks that would have resulted from encoding based on a single bitrate, as described above.

However, because the different compute instances compute the bitrate for each source chunk independently from one another, the constant rate factor does not typically result in globally optimized bitrates that balance between resource allocation across different chunks with visual quality. In particular, with a constant rate factor approach, each additional bit that the compute instances allocate during encoding may still result in an over-allocation of bits to one chunk and an under-allocation of bits to a different chunk. Consequently, for the total number of bits that are used to encode the source data, the overall visual quality of the aggregate encode may not be optimized. Further, constant rate factor encoding is only available in certain encoders. For example, constant rate factor encoding is not available in the libvpx implementation of VP9.

As the foregoing illustrates, what is needed in the art are more effective approaches for allocating bitrates during distributed encoding processes.

SUMMARY OF THE INVENTION

One embodiment of the present invention sets forth a computer-implemented method for allocating bitrates during distributed encoding processes. The method includes generating a curve based on multiple points, where each point specifies a different visual quality level and a corresponding encoding bitrate for encoding a first chunk included in multiple chunks of source data; computing a first encoding bitrate for encoding the first chunk based on the generated curve and a computed optimization factor that is associated with different visual quality levels and corresponding encoding bitrates for the chunks; and causing the first chunk to be encoded at the first encoding bitrate.

One advantage of the disclosed techniques is that encoding each chunk based on the chunk-specific computed bitrate results in an aggregate encode that is optimized across the chunks with respect to the single computed optimization factor. Consequently, unlike conventional bitrate allocation techniques for distributed encoding, for any given bitrate, the constant-slope bitrate allocator optimizes the overall visual quality of the aggregate encode.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
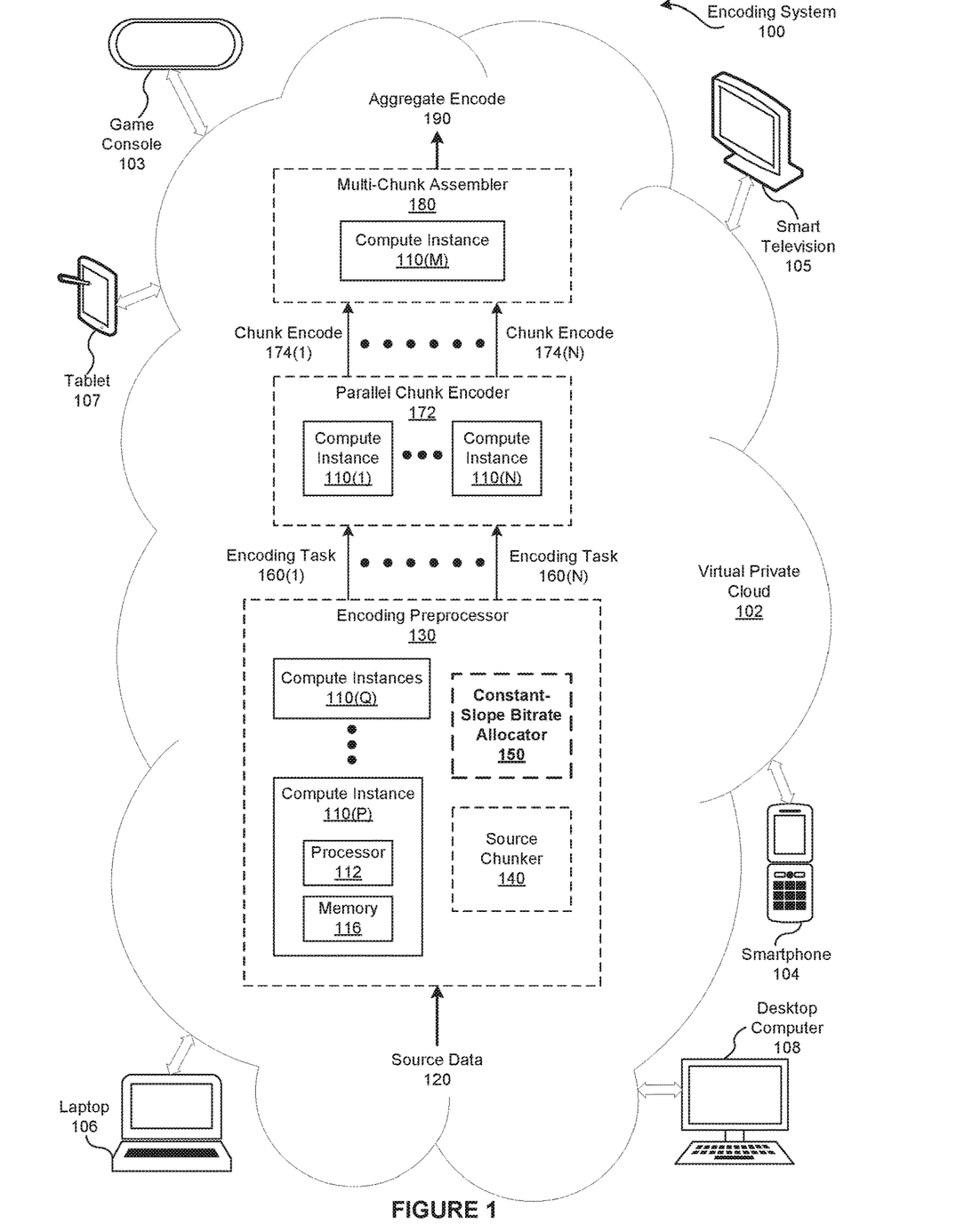
FIG. 1 is a conceptual illustration of an encoding system configured to implement one or more aspects of the present invention.

FIG. 1 is a conceptual illustration of an encoding system 100 configured to implement one or more aspects of the present invention. As shown, the encoding system 100 includes a virtual private cloud (i.e., encapsulated shared resources, software, data, etc.) 102 connected to a variety of devices capable of transmitting input data and/or displaying video content. Such devices include, without limitation, a game console 103, a smartphone 104, a smart television 105, a laptop 106, a tablet 107, and a desktop computer 108. In alternate embodiments, the encoding system 100 may include any number and/or type of input, output, and/or input/output devices in any combination.

The virtual private cloud 102 includes, without limitation, any number and type of compute instances 110. The virtual private cloud 102 receives input user information from an input device (e.g., the laptop 106), one or more computer instances 110 operate on the user information, and the virtual private cloud 102 transmits processed information to the user. The virtual private cloud 102 conveys output information to the user via display capabilities of any number of devices, such as a conventional cathode ray tube, liquid crystal display, light-emitting diode, or the like.

In alternate embodiments, the virtual private cloud 102 may be replaced with any type of cloud computing environment, such as a public or a hybrid cloud. In other embodiments, the encoding system 100 may include any distributed computer system instead of the virtual private cloud 102. In yet other embodiments, the encoding system 100 does not include the virtual private cloud 102 and, instead, the encoding system 100 includes a single computing unit that implements multiple processing units (e.g., central processing units and/or graphical processing units in any combination).

For explanatory purposes, multiple instances of like objects are denoted with reference numbers identifying the object and parenthetical numbers identifying the instance where needed. As shown for the compute instance 110(P), each compute instance 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 included in the virtual private cloud 102 are configured to implement one or more applications. More specifically, the compute instances 110 included in the virtual private cloud 102 are configured to encode source data 120, such as a video file. As shown, the compute instances 110(P)-110(Q) are configured as an encoding preprocessor 130, the compute instances 110(1)-110(N) are configured as a parallel chunk encoder 172, and the compute instance 110(M) is configured as a multi-chunk assembler 180. In alternate embodiments, any number of the compute instances may be configured as the encoding processor 130, the parallel chunk encoder 172, and the multi-chunk assembler 180, in any combination. For example, in some embodiments, the compute instance 110(1) could be configured as both the encoding preprocessor 130 and the multi-chunk assembler 180, and the compute instances 110(2)-110(33) could be configured as the parallel chunk encoder 172.

In operation, a source chunker 140 included in the encoding preprocessor 130 receives the source data 120 and breaks the source data 120 into N different source chunks (not shown in FIG. 1) where N corresponds to the number of compute instances 110 included in the parallel chunk encoder 172. For each source chunk, the encoding preprocessor 130 generates an encoding task 160 that configures a different one of the compute instances 110 included in the parallel chunk encoder 172 to perform encoding operations on the source chunk to create a corresponding chunk encode 174. The multi-chunk assembler 180 then combines the chunk encodes 174(1)-174(N) into an aggregate encode 190. In alternate embodiments, the source chunker 140 ay break the source data 120 into any number of source chunks, and the number of source chunks may or may not equal the number of compute instances 110 included in the parallel chunk encoder 172.

As persons skilled in the art will recognize, each of the source chunks includes source data for a specific time interval. Consequently the bitrate at which the parallel chunk encoder 172 encodes a particular source chunk determines the number of bits that are included in the resulting chunk encode 174. Accordingly, optimizing the bitrate for a particular source chunk may also be referred to herein as optimizing the number of bits allocated for encoding the source chunk or allocating the optimum number of bits for encoding the source chunk.

To optimize encoding time, irrespective of the number of chunks and the number of computer instances 110 included in the parallel chunk encoder 172, the parallel chunk encoder 172 encodes the source chunks independently and substantially in parallel. As referred to herein, encoding source chunks "substantially in parallel," comprises performing different encoding operations involving two or more source chunks, where at least a portion of the different encoding operations overlap partially or fully in time. One limitation of the parallel chunk encoder 172 is that there is no feedback between the compute instances 110 that encode different chunks during the per-chunk distributed encoding process. Consequently, optimizing tradeoffs across the chunks during the encoding process is difficult. In particular, conventional approaches for allocating the number of bits used to encode each of the source chunks, also referred to herein as the bitrate, oftentimes result in sub-optimal tradeoffs between bitrate and visual quality.

For instance, some conventional encoding approaches compute a single constant rate factor that represents a target overall level of visual quality. For each source chunk, a compute instance independently estimates the complexity of each frame included in the source chunk and then allocates the number of bits used to encode each frame based on the estimated complexity and the constant rate factor. However, because the different compute instances compute the bitrate for each source chunk independently from one another, the constant rate factor does not typically result in globally optimized bitrates that balance between resource allocation across different chunks with visual quality. In particular, with a constant rate factor approach, each additional bit that the compute instances allocate during encoding may still result in an over-allocation of bits to one chunk and an under-allocation of bits to a different chunk. Consequently, for the total number of bits that are used to encode the source data, the overall visual quality of the aggregate encode may not be optimized. Further, constant rate factor encoding is only available in certain encoders. For example, constant rate factor encoding is not available in the libvpx implementation of VP9.

Constant-Slope Bitrate Allocation

To ensure that each additional bit that the parallel chunk encoder 172 allocates during encoding of the source data 120 is allocated to the optimal chunk encode 174, the encoding preprocessor 130 includes a constant-slope bitrate allocator 150. In general, the constant-slope bitrate allocator 150 implements a constant slope interpretation of Lagrangian optimization to globally optimize a single bitrate-quality tradeoff while allocating bitrates to source chunks. More specifically, the constant-slope bitrate allocator 150 determines a Lagrange multiplier, referred to herein as lambda ($\lambda$), that reflects a desired, global bitrate-quality tradeoff for the source data 120. For each source chunk, the constant-slope bitrate allocator 150 then individually computes an optimized chunk-specific bitrate, referred to herein as a chunk bitrate, based on a chunk-specific bitrate-quality curve and the single lambda.

For each source chunk, the encoding preprocessor 130 then generates the encoding task 160 that configures the corresponding compute instance 110 included in the parallel chunk encoder 174 to encode the source chunk at the associated chunk bitrate. As persons skilled in the art will recognize, because each of the chunk bitrates is optimized with respect to lambda, Lagrangian optimization ensures that the chunk encodes 174 are globally optimized with respect to the global bitrate-quality tradeoff reflected by lambda. Consequently each additional bit allocated during encoding is allocated to the optimal chunk encode 174 and, for the total number of bits that are included in the resulting aggregate encode 190, the overall visual quality of aggregate encode 190 is optimized.

Note that the techniques described herein are illustrative rather than restrictive, and may be altered without departing from the broader spirit and scope of the invention. In particular, the functionality provided by the constant-slope bitrate allocator 150 may be implemented in any number (including 1) of compute instances 110 and software applications in any combination. For example, in some embodiments, each of the compute instances 110 included in the parallel chunk encoder 172 may implement a portion of the functionality of the constant-slope bitrate allocator 150. In such embodiments, in addition to encoding the source chunks substantially in parallel, the compute instances 110 included in the parallel chunk encoder 172 may compute optimized chunk bitrates individually and substantially in parallel.

Figure 2:
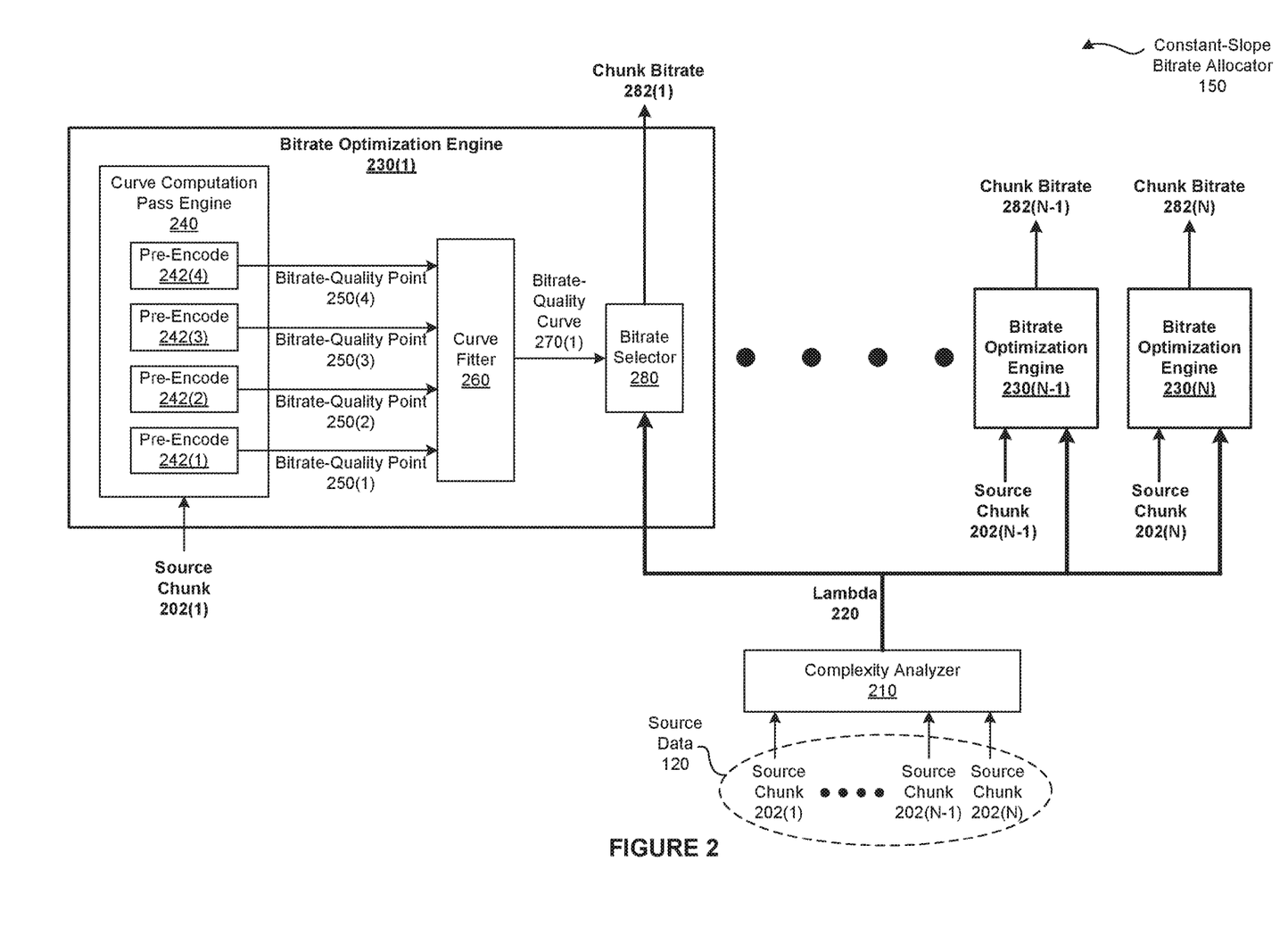
FIG. 2 is a more detailed illustration of the constant-slope bitrate allocator of FIG. 1, according to various embodiments of the present invention.

FIG. 2 is a more detailed illustration of the constant-slope bitrate allocator 150 of FIG. 1, according to various embodiments of the present invention. As shown, the constant-slope bitrate allocator 150 includes, without limitation, a complexity analyzer 210 and a bitrate optimization engine 230. As also shown, the source data 102 is partitioned into source chunks 202(1)-202(N).

The complexity analyzer 210 receives all the source chunks 202 included in the source data 120 and computes a lambda 220 based on a desired rate-quality tradeoff for the source data 102. The complexity analyzer 210 may be configured to implement any desired rate-quality tradeoff in any technically feasible fashion. As persons skilled in the art will recognize, the complexity analyzer 210 may leverage techniques that are conventionally used to compute a single constant rate factor that represents a target visual quality. The lambda 220 is also referred to herein as a Lagrangian multiplier and/or an optimization factor.

For example, the complexity analyzer 210 could be configured to determine a bitrate that ensures that 95 percent of the chunk encodes 174 exceed a predetermined visual quality level. The complexity analyzer 210 could encode the source chunks 202 included in the source data 120 at the predetermined visual quality level and then construct a cumulative distribution function (CDF) based on the corresponding encoded bitrates. Based on the CDF, the complexity analyzer 210 could set a "representative" source chunk 202 and a "representative" bitrate to, respectively, the source chunk 202 and the encoded bitrate that correspond to the 95$^{th}$ percentile of the source chunks 202.

For the representative source chunk 202, the complexity analyzer 210 could generate multiple representative pre-encodes at a variety of visual quality levels and then construct a representative bitrate-quality curve based on the representative pre-encodes. Subsequently, the complexity analyzer 210 could select a tangent to the representative bitrate-quality curve at the representative bitrate or quality as the global bitrate-quality tradeoff. Finally, the complexity analyzer 210 could set the lambda (i.e., the Lagrangian multiplier in a constant-slope interpretation of Lagrangian optimization) equal to the slope of the tangent.

In alternate embodiments, the constant-slope bitrate allocator 150, the complexity analyzer 210, or any other component included in the encoding system 100 may determine the global bitrate-quality tradeoff and/or the lambda 220 in any technically feasible fashion. For instance, in some embodiments, the complexity analyzer 210 may implement heuristics to estimate the representative chunk and representative bitrate. In other embodiments, the constant-slope bitrate allocator 150 may not include the complexity analyzer 210, and the constant-slope bitrate allocator 150 may receive the lambda 220 from a graphical user interface.

In general, the constant-slope bitrate allocator 150 may determine the lambda 220 based on any number of heuristics and configuration inputs. Some examples of configuration inputs include a specified type of the source data 120 (e.g., action file, documentary, etc.), a target visual quality, and a programmable parameter that specifies a percentile for identifying a representative chunk, to name a few. In alternate embodiments, the constant-slope bitrate allocator 150 or the complexity analyzer 210 may select the lambda 220 in any technically feasible fashion based on resource constraints such as available bandwidth, equipment capabilities, and the like. For example, the complexity analyzer 210 could implement iterative techniques (e.g., bisection search) to determine a value for the lambda 220 that meets a total "budget" of bits available for encoding.

As shown, for each of the source chunks 202, a separate instance of the bitrate optimization engine 230 receives the source chunk 202 and the lambda 220, and then computes a chunk bitrate 282 associated with the source chunk 202. The instances of the bitrate optimization engine 230 operate on the source chunks 202 individually and substantially in parallel. In alternate embodiments, the constant-slope bitrate allocator 150 may include any number of instances (including 1) of the bitrate optimization engines 230. Further the instances of the bitrate optimization engines 230 may operate concurrently, sequentially, or in any combination thereof.

Irrespective of how the bitrate optimization engine 230 is configured to operate on the source chunks 202, the bitrate optimization engine 230 performs Lagrangian optimization operations to determine the different chunk bitrate 282 for each of the source chunks 202 based on the lambda 220. Consequently, encoding each of the source chunks 202 at the corresponding chunk bitrate 282 ensures that the aggregate encode 190 is optimized with respect to the global bitrate-quality tradeoff reflected by the lambda 220.

As shown, the bitrate optimization engine 230 includes, without limitation, a curve computation pass engine 240, a curve fitter 260, and a bitrate selector 280. Upon receiving the source chunk 202, the curve computation pass engine 240 generates four per-encodes 242. More precisely, for each of four different predetermined visual quality levels, the curve computation pass engine 240 configures an encoder (e.g., the parallel chunk encoder 172) to encode the source chunk 202 at the visual quality level.

In alternate embodiments, the curve computation pass engine 240 may generate any number of pre-encodes 242 at any number of visual quality levels. Further, the curve computation pass engine 240 may generate the pre-encodes 242 and determine the visual quality levels in any technically feasible fashion. For instance, in some embodiments the curve-computation pass engine 240 may implement heuristics to generate approximate pre-encode 242 for twelve visual quality levels that the curve-computation pass engine 240 may receive from a graphical user interface.

Advantageously, the constant-slope bitrate allocator 150 and/or the complexity analyzer 210 may be configured based on any number and type of visual quality metrics (including distortion metrics) irrespective of the capabilities of the parallel chunk encoder 172. Some examples of visual quality metrics include, without limitation, Video Multimethod Assessment Fusion (VMAF), detail loss measure (DLM), visual information fidelity (VIF), structural similarity (SSIM) index, and mean-squared-error (MSE). By contrast, conventional techniques for bit allocation rely on the visual quality metrics that are implemented in the parallel chunk encoder 172.

The curve computation pass engine 240 analyzes each of the pre-encodes 242 to determine a corresponding bitrate-quality point 250. More precisely, for each of the pre-encodes 242, the curve-computation pass engine 240 generates the bitrate-quality point 250 that includes the bitrate of the pre-encode 242 and the predetermined visual quality level associated with the pre-encode 242. In alternate embodiments, the curve computation pass engine 240 may generate the bitrate-quality points 250 in any technically feasible fashion. In some alternate embodiments, the curve computation pass engine 240 may not generate the pre-encodes 242 and instead implement heuristics to estimate the bitrate-quality points 250.

Subsequently, the curve fitter 260 generates a bitrate-quality curve 270 that is associated with the source chunk 202 based on the bitrate-quality points 250. The curve fitter 260 may generate the bitrate-quality curve 270 in any technically feasible fashion. For instance, in some embodiments and as described in detail below in conjunction with FIG. 3, the curve fitter 260 may fit a logarithmic curve to the bitrate-quality curve 250 and then set the bitrate-quality curve 270 equal to the logarithmic curve. In other embodiments, the curve fitter 260 may fit a polynomial curve to the bitrate-quality points 250 and then set the bitrate-quality curve 270 equal to the polynomial curve.

As shown, the bitrate selector 280 receives the bitrate-quality curve 270 and the lambda 220. In general, the bitrate selector 280 performs operations that identify a bitrate at which the slope of a tangent to the bitrate-quality curve 270 equals the lambda 220. The bitrate selector 280 then sets the chunk bitrate 282 associated with the source chunk 202 a equal to the identified bitrate. The bitrate selector 280 may perform any number and type of operations that are consistent with the characteristics of the bitrate-quality curve 270 and the characteristics of the lambda 220 to determine the chunk bitrate 282. For example, as detailed below in conjunction with FIG. 3, the bitrate selector 280 may set a derivative of the bitrate-quality curve 270 equal to the lambda 220 and then solve for the chunk bitrate 282.

Note that the techniques described herein are illustrative rather than restrictive, and may be altered without departing from the broader spirit and scope of the invention. In particular, the functionality provided by the constant-slope bitrate allocator 150, the bitrate optimization engine 230, and/or the complexity analyzer 210 may be implemented in any number (including 1) of software applications in any combination. Further, in various embodiments, any number of the techniques disclosed herein may be implemented while other techniques may be omitted in any technically feasible fashion.

Many modifications and variations on the functionality provided by the constant-slope bitrate allocator 150, the bitrate optimization engine 230, and/or the complexity analyzer 210 will be apparent to those of ordinary skill in the art without departing from the scope and spirit of the described embodiments. For example, in some embodiments, the constant-slope bitrate allocator 150 may be configured to generate and analyze bitrate-distortion curves instead of the bitrate-quality curves 270.

Figure 3:
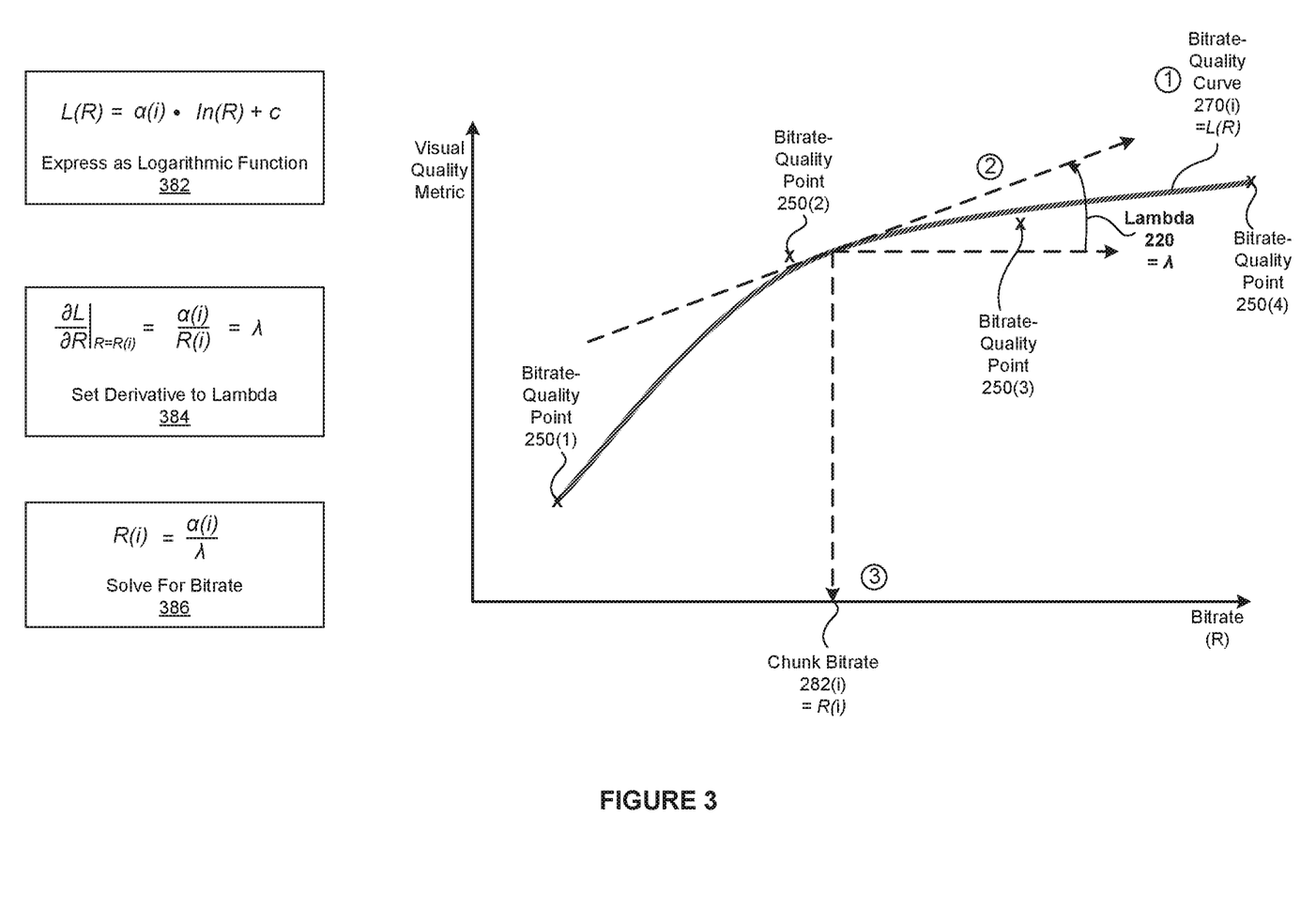
FIG. 3 is an exemplary illustration of operations performed by the bitrate optimization engine of FIG. 2, according to various embodiments of the present invention.

FIG. 3 is an exemplary illustration of operations performed by the bitrate optimization engine 230(i) of FIG. 2, according to various embodiments of the present invention. As outlined previously herein, the bitrate optimization engine 230(i) optimizes the chunk bitrate 282(i) associated with the source chunk 202(i) with respect to the lambda 220. For explanatory purposes only, a sequence of operations is expressed graphically. Further, an analogous, alternate sequence of operations is expressed in equation form.

To compute the chunk bitrate 282(i) graphically, the curve fitter 260(i) executes the operations depicted by the circles labeled "1," "2, and "3." First, as the circle labeled "1" depicts, the curve fitter 260(i) fits a logarithmic curve to the bitrate-quality points 250. The curve fitter 260(i) then sets the bitrate-quality curve 270(i) equal to the fitted logarithmic curve. In this fashion, the bitrate-quality curve 270(i) approximates the bitrate-quality points 250. Second, as the circle labeled "2" depicts, the curve fitter 260(i) identifies a tangent to the bitrate-quality curve 270(i) for which the slope equals the lambda 220. Finally, as the circle labeled "3" depicts, the curve fitter 260(i) set the chunk bitrate 282(i) equal to the bitrate corresponding to the identified tangent.

To compute the chunk bitrate 282(i) based on the bitrate-quality curve 270(i) expressed in equation form (as an "express as logarithmic function" 382 depicts), the bitrate selector 280 first expresses the bitrate-quality curve 270 as a logarithmic function (L) of the bitrate (R) as follows:

$$L(R)=a(i) \cdot ln(R)+c \quad (1)$$

Second, as a "set derivative to lambda" 384 depicts, the bitrate selector 280 sets a derivative of the logarithmic function equal to the lambda 220 as follows:

$$\left.\frac{\partial L}{\partial R}\right|_{R=R(i)} = \frac{a(i)}{R(i)} = \lambda \quad (2)$$

Finally, as a "solve for bitrate" 386 depicts, the bitrate selector 280 solves for the chunk bitrate 282(i) as follows:

$$R(i) = \frac{a(i)}{\lambda} \quad (3)$$

In alternate embodiments, the bitrate optimization engine 230(i) may implement any number and types of operations that optimize the chunk bitrate 282(i) based on the lambda 220. For example, to compute the chunk bitrate 282(i), the bitrate optimization engine 230(i) could divide the slope of a log-log graph of the bitrate-quality curve 270(i) by the lambda 220.

Figure 4:
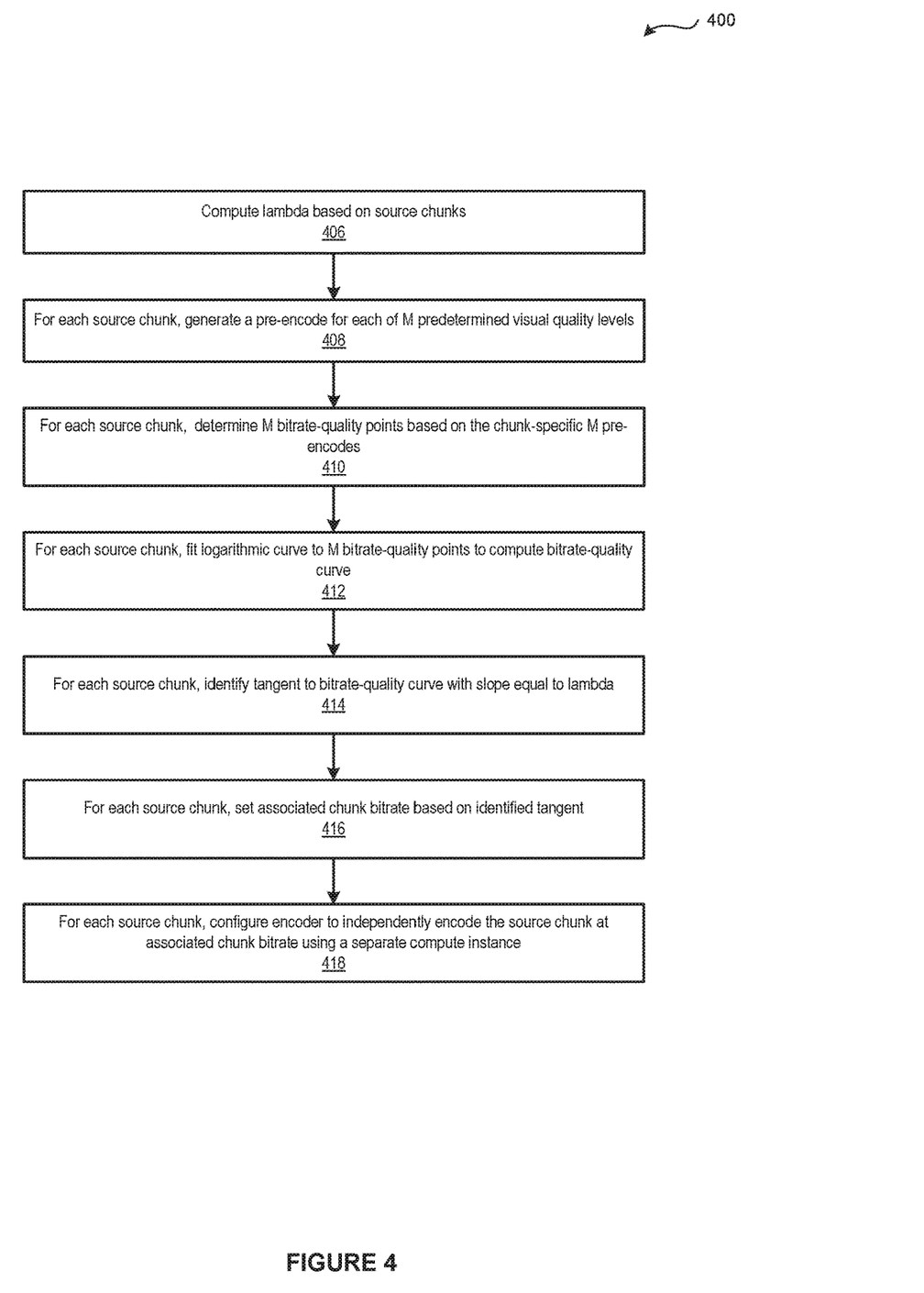
FIG. 4 is a flow diagram of method steps for allocating bitrates when encoding source data, according to various embodiments of the present invention.

FIG. 4 is a flow diagram of method steps for allocating bitrates when encoding source data, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 406 where the complexity analyzer 210 computes the lambda 220 based on the source chunks 202 included in the source data 120. The lambda 220 reflects a global bitrate-quality tradeoff for the source data 120. The complexity analyzer 210 may compute the lambda 220 in any technically feasible fashion that is consistent with the use of the lambda 220 as a Lagrangian multiplier for optimizing the chunk bitrates 282. For instance, in some embodiments, the complexity analyzer 210 may implement the method steps of FIG. 5 (described below) to compute the lambda 220.

At step 408, for each of the source chunks 202, the curve computation pass engine 240 encodes the source chunk 202 t M predetermined visual quality levels to generate M pre-encodes 242. At step 410, for each of the source chunks 202, the curve-computation pass engine 240 determines M bitrate-quality points 250 based on the M pre-encodes 242. Each of the bitrate-quality points 250 includes a predetermined visual quality level and the encoded bitrate of the pre-encode 242 that is encoded at the predetermined visual quality level.

In alternate embodiments, the curve computation pass engine 240 may generate the pre-encodes 242 and/or determine the bitrate-quality points 250 in any technically feasible fashion. For instance, in some alternate embodiments, the curve computation pass engine 240 may estimate the bitrate-quality points 250 based on heuristics. In such embodiments, the curve computation pass engine 240 may not execute step 408.

At step 412, for each of the source chunks 202, the curve fitter 260 fits a logarithmic curve to the M bitrate-quality points 250 to generate the bitrate-quality curve 270 associated with the source chunk 202. In alternate embodiments, the curve fitter 260 may generate the bitrate-quality curve 270 in any technically feasible fashion. For instance, in alternate embodiments, the curve fitter 260 may fit a polynomial curve to the bitrate-quality points 250 and then set the bitrate-quality curve 270 equal to the polynomial curve.

At step 414, for each of the source chunks 202, the bitrate selector 280 identifies a tangent to the bitrate-quality curve 270 with a slope that is equal to the lambda 220. The bitrate selector 280 may identify the tangent in any technically feasible fashion. At step 416, for each of the source chunks 202, the bitrate selector 280 sets the chunk bitrate 282 for the source chunk 202 based on the identified tangent for the associated bitrate-quality curve 270. More specifically, the bitrate selector 280 sets the chunk bitrate 282 to the bitrate corresponding to the identified tangent.

In alternate embodiments, for each of the source chunks 202(i), the bitrate selector 280 may compute the chunk bitrate 282(i) based on the bitrate-quality curve 270(i) in any technically feasible fashion. For instance, in some embodiments, the bitrate selector 280 may set a derivative of the bitrate-quality curve 270(i) equal to the lambda 220 and then solve for the chunk bitrate 282(i). In such embodiments, the bitrate selector 280 may not execute step 414 and/or 416.

At step 418, for each of the source chunks 202, the encoding preprocessor 130 configures a separate compute instance 110 included in the parallel chunk encoder 172 to independently encode the source chunk 202 at the associated chunk bitrate 282. In this fashion, the encoding preprocessor 130 ensures that the parallel chunk encoder 172 generates each of the chunk encodes 174 based on a single, global bitrate-quality tradeoff.

Figure 5:
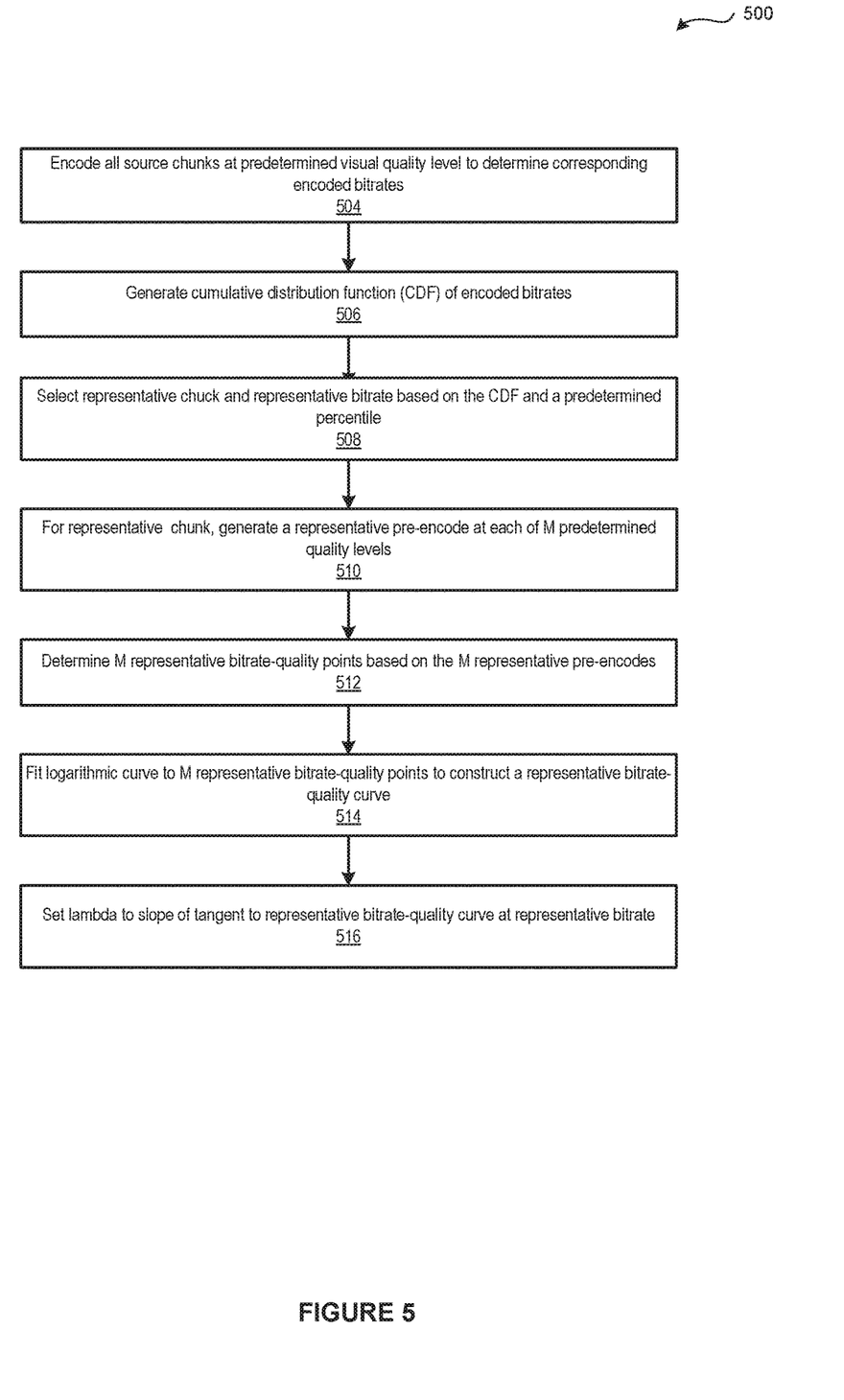
FIG. 5 is a flow diagram of method steps for computing a factor that is designed to optimize bitrate allocations and overall image quality when encoding source data, according to various embodiments of the present invention.

FIG. 5 is a flow diagram of method steps for computing a factor that is designed to optimize bitrate allocations and overall image quality when encoding source data, according to various embodiments of the present invention. Although the method steps are described with reference to the systems of FIGS. 1-3, persons skilled in the art will understand that any system configured to implement the method steps, in any order, falls within the scope of the present invention.

As shown, a method 500 begins at step 504, where the complexity analyzer 210 encodes the source chunks 202 included in the source data 120 at a predetermined visual quality level to determine the corresponding encoded bitrates. At step 506, the complexity analyze 210 generates a cumulative distribution function (CDF) of the encoded bitrates. At step 508, the complexity analyzer 210 selects a representative chunk and a representative bitrate based on the CDF and a predetermined percentile. More specifically, the complexity analyzer 210 analyzes the CDF and sets the representative bitrate to a bitrate that exceeds the encoded bitrates for the predetermined percentile of the source chunks 202. The complexity analyzer 210 hen sets the representative chunk to the source chunk 202 associated with the representative bitrate. In alternate embodiments, the complexity analyzer 210 may select the representative chunk and the representative bitrate in any technically feasible fashion.

At step 510, for the representative chunk, the complexity analyzer 210 generates a representative pre-encode at each of M predetermined visual quality levels. At step 512, the complexity analyzer determines M representative bitrate-quality points based on the M pre-encodes. Each of the M representative bitrate-quality point specifies a predetermined visual quality level and the encoded bitrate of the representative pre-encode that is encoded at the predetermined visual quality level.

At step 514, the complexity analyzer 210 fits a logarithmic curve to the M representative bitrate-quality points to construct a representative bitrate-quality curve. In alternate embodiments, the complexity analyzer 210 may fit any type of curve to the representative bitrate-quality points in any technically feasible fashion. At step 516, the complexity analyzer sets the lambda 220 to a slope of a tangent to the representative bitrate-quality curve corresponding to the representative bitrate. The method 500 hen terminates.

In sum, the disclosed techniques may be used to allocate bitrates across the source chunks included in source data (e.g., movie, etc.) during a distributed encoding process. A constant-slope bitrate allocator includes a complexity analyzer and multiple instances of a bitrate optimization engine. The complexity analyzer analyzes the source chunks to compute a single lambda that represents a globally optimized tradeoff between bitrate and quality for encoding the source data. Subsequently and substantially in parallel, for each source chunk, an instance of a bitrate optimization engine leverages Lagrangian optimization techniques to compute a chunk bitrate based on the lambda. More specifically, for each source chunk, the bitrate optimization engine approximates a bitrate-quality curve associated with encoding the source chunk and identifies a point on the curve where the slope of the curve matches lambda. The bitrate optimization engine then sets the chunk bitrate equal to the bitrate of the identified point.

Advantageously, encoding each chunk based on the corresponding chunk bitrate results in an aggregate encode that is optimized across the chunks with respect to a global tradeoff between bitrate and quality. Consequently, unlike conventional bitrate allocation techniques for distributed encoding, for any given bitrate, the constant-slope bitrate allocator optimizes the overall visual quality of the aggregate encode. Further, unlike conventional bitrate allocation techniques that are based on a constant rate factor, encoders for any compression standard, including VP9, may implement the disclosed bitrate allocation techniques based on any quality metric.

1. In some embodiments, a method comprises generating a curve based on a plurality of points, wherein each point specifies a different visual quality level and a corresponding encoding bitrate for encoding a first chunk included in a plurality of chunks of source data; computing a first encoding bitrate for encoding the first chunk based on the generated curve and a computed optimization factor that is associated with different visual quality levels and corresponding encoding bitrates for the plurality of chunks; and causing the first chunk to be encoded at the first encoding bitrate.

2. The method of clause 1, wherein generating the curve comprises performing one or more curve-fitting operations based on the plurality of points.

3. The method of clauses 1 or 2, further comprising prior to generating the curve, computing a first point included in the plurality of points, and computing a second point included in the plurality of points substantially in parallel to computing the first point.

4. The method of any of clauses 1-3, wherein computing the first point comprises configuring an encoder to encode the first chunk based on a first visual quality level, and determining the corresponding encoding bitrate based on the encoded first chunk.

5. The method of any of clauses 1-4, wherein computing the first encoding bitrate comprises determining a tangent to the generated curve, and determining a value for an encoding bitrate that corresponds to the tangent based on the generated curve.

6. The method of any of clauses 1-5, wherein computing the first encoding bitrate comprises performing one or more Lagrangian optimization operations on the generated curve based on the computed optimization factor.

7. The method of any of clauses 1-6, wherein computing the computed optimization factor comprises generating a representative curve that is associated with encoding a representative chunk included in the plurality of chunks; computing a tangent to the representative curve corresponding to a representative encoding bitrate; and determining the slope of the tangent.

8. The method of any of clauses 1-7, wherein causing the first chunk to be encoded at the first encoding bitrate comprises configuring an encoder to encode the first chunk at the first encoding bitrate, and further comprising configuring the encoder to encode a second chunk included in the plurality of chunks at a second encoding bitrate and substantially in parallel to encoding the first chunk.

9. In some embodiments, a computer-implemented computer-readable storage medium includes instructions that, when executed by a processor, cause the processor to perform the steps of performing one or more curve computation operations to generate a first curve that specifies different visual quality levels and corresponding encoding bitrates for encoding a first chunk included in a plurality of chunks of source data; performing one or more optimization operations to compute a first encoding bitrate for encoding the first chunk based on the first curve and a Lagrangian multiplier that is associated with different visual quality levels and corresponding encoding bitrates when encoding the plurality of chunks; performing one or more optimization operations to compute a second encoding bitrate for encoding a second chunk included in the plurality of chunks based on a second curve and the Lagrangian multiplier; causing the first chunk to be encoded at the first encoding bitrate; and causing the second chunk to be encoded at the second encoding bitrate and substantially in parallel to the encoding of the first chunk.

10. The computer-readable storage medium of clause 9, wherein the first curve comprises a logarithmic curve.

11. The computer-readable storage medium of clauses 9 or 10, wherein performing the one or more curve computation operations comprises computing a plurality of points, wherein each point specifies a different visual quality level and a corresponding encoding bitrate for encoding the first chunk, and performing one or more curve-fitting operations based on the plurality of points.

12. The computer-readable storage medium of any of clauses 9-11, wherein computing a first point included in the plurality of points comprises configuring an encoder to encode the first chunk based on a first visual quality level, and determining the corresponding encoding bitrate based on the encoded first chunk.

13. The computer-readable storage medium of any of clauses 9-12, wherein the visual quality levels are based on at least one of a Video Multimethod Assessment Fusion, a peak signal-to-noise ratio, and a mean-squared-error.

14. The computer-readable storage medium of any of clauses 9-13, wherein performing the one or more optimization operations to compute the first encoding bitrate comprises determining a tangent to the first curve, and determining a value for an encoding bitrate that corresponds to the tangent based on the first curve.

15. The computer-readable storage medium of any of clauses 9-14, further comprising prior to performing the one or more optimization operations to compute the first encoding bitrate generating a representative curve that is associated with encoding a representative chunk included in the plurality of chunks; computing a tangent to the representative curve corresponding to a representative encoding bitrate; and setting the Lagrangian multiplier equal to the slope of the tangent.

16. The computer-readable storage medium of any of clauses 9-15, wherein causing the first chunk to be encoded at the first encoding bitrate comprises configuring an encoder that implements a VP9 video compression standard to encode the first chunk at the first encoding bitrate.

17. The computer-readable storage medium of any of clauses 9-16, wherein performing the one or more optimization operations to compute the second encoding bitrate occurs substantially in parallel to performing the one or more optimization operations to compute the first encoding bitrate.

18. In some embodiments, a system comprises a memory storing instructions; and a processor that is coupled to the memory and, when executing the instructions, is configured to determine a Lagrangian multiplier that is associated with different visual quality levels and corresponding encoding bitrates when encoding a plurality of chunks of source data; for each chunk included in the plurality of chunks, independently performing one or more optimizations operations based on the Lagrangian multiplier to determine an encoding bitrate; and for each chunk included in the plurality of chunks, causing the chunk to be encoded at the encoding bitrate associated with the chunk.

19. The system of clause 18, wherein the visual quality levels are based on at least one of a Video Multimethod Assessment Fusion, a peak signal-to-noise ratio, and a mean-squared-error.

20. The system of clauses 18 or 19, wherein the processor is configured to perform the one or more optimization operations for a first chunk included in the plurality of chunks by generating a first curve that specifies different visual quality levels and corresponding encoding bitrates for encoding the first chunk; determining a tangent to the first curve; and determining a value for an encoding bitrate that corresponds to the tangent based on the first curve.

21. The system of any of clauses 18-20, wherein the processor is configured to perform the one or more optimization operations for a first chunk included in the plurality of chunks by generating a first curve that specifies different visual quality levels and corresponding encoding bitrates for encoding the first chunk; computing a derivative of the first curve; and determining a value for an encoding bitrate based on the derivative.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
computing an optimization factor for a plurality of chunks of source data by:
generating a representative curve that is associated with encoding a representative chunk included in the plurality of chunks;
computing a tangent to the representative curve corresponding to a representative encoding bitrate; and
setting the optimization factor equal to a slope of the tangent;
generating a curve based on a plurality of points, wherein each point specifies a different visual quality level and a corresponding encoding bitrate for encoding a first chunk included in the plurality of chunks of source data;
computing a first encoding bitrate for encoding the first chunk based on the generated curve and the optimization factor, wherein computing the first encoding bitrate further comprises identifying an encoding bitrate at which a slope of the generated curve equals the optimization factor; and
causing the first chunk to be encoded at the first encoding bitrate.

2. The computer-implemented method of claim 1, wherein generating the curve comprises performing one or more curve-fitting operations based on the plurality of points.

3. The computer-implemented method of claim 1, further comprising prior to generating the curve, computing a first point included in the plurality of points, and computing a second point included in the plurality of points substantially in parallel to computing the first point.

4. The computer-implemented method of claim 3, wherein computing the first point comprises configuring an encoder to encode the first chunk based on a first visual quality level, and determining the corresponding encoding bitrate based on the encoded first chunk.

5. The computer-implement method of claim 1, wherein computing the first encoding bitrate comprises determining a tangent to the generated curve, and determining a value for an encoding bitrate that corresponds to the tangent based on the generated curve.

6. The computer-implement method of claim 1, wherein computing the first encoding bitrate comprises performing one or more Lagrangian optimization operations on the generated curve based on the computed optimization factor.

7. The computer-implemented method of claim 1, wherein causing the first chunk to be encoded at the first encoding bitrate comprises configuring an encoder to encode the first chunk at the first encoding bitrate, and further comprising configuring the encoder to encode a second chunk included in the plurality of chunks at a second encoding bitrate and substantially in parallel to encoding the first chunk.

8. The computer-implemented method of claim 1, wherein the representative encoding bitrate comprises an encoding bitrate that ensures that a predetermined percentage of the plurality of chunks achieves a target visual quality level when encoded.

9. A computer-readable storage medium including instructions that, when executed by a processor, cause the processor to perform the steps of:
computing a Lagrangian multiplier for a plurality of chunks of source data by:
generating a representative curve that is associated with encoding a representative chunk included in a plurality of chunks;
computing a tangent to the representative curve corresponding to a representative encoding bitrate; and
setting the Lagrangian multiplier equal to a slope of the tangent;
performing one or more curve computation operations to generate a first curve that specifies different visual quality levels and corresponding encoding bitrates for encoding a first chunk included in the plurality of chunks of source data;
performing one or more optimization operations to compute a first encoding bitrate for encoding the first chunk based on the first curve and the Lagrangian multiplier, wherein the first encoding bitrate is further computed by identifying an encoding bitrate at which a slope of the first curve equals the Lagrangian multiplier;
performing one or more optimization operations to compute a second encoding bitrate for encoding a second chunk included in the plurality of chunks based on a second curve and the Lagrangian multiplier;
causing the first chunk to be encoded at the first encoding bitrate; and
causing the second chunk to be encoded at the second encoding bitrate and substantially in parallel to the encoding of the first chunk.

10. The computer-readable storage medium of claim 9, wherein the first curve comprises a logarithmic curve.

11. The computer-readable storage medium of claim 9, wherein performing the one or more curve computation operations comprises computing a plurality of points, wherein each point specifies a different visual quality level and a corresponding encoding bitrate for encoding the first chunk, and performing one or more curve-fitting operations based on the plurality of points.

12. The computer-readable storage medium of claim 11, wherein computing a first point included in the plurality of points comprises configuring an encoder to encode the first chunk based on a first visual quality level, and determining the corresponding encoding bitrate based on the encoded first chunk.

13. The computer-readable storage medium of claim 9, wherein the visual quality levels are based on at least one of a Video Multimethod Assessment Fusion, a peak signal-to-noise ratio, and a mean-squared-error.

14. The computer-readable storage medium of claim 9, wherein performing the one or more optimization operations to compute the first encoding bitrate comprises determining a tangent to the first curve, and determining a value for an encoding bitrate that corresponds to the tangent based on the first curve.

15. The computer-readable storage medium of claim 9, wherein causing the first chunk to be encoded at the first encoding bitrate comprises configuring an encoder that implements a VP9 video compression standard to encode the first chunk at the first encoding bitrate.

16. The computer-readable storage medium of claim 9, wherein performing the one or more optimization operations to compute the second encoding bitrate occurs substantially in parallel to performing the one or more optimization operations to compute the first encoding bitrate.

17. A system, comprising:
a memory storing instructions; and
a processor that is coupled to the memory and, when executing the instructions, is configured to:
  compute a Lagrangian multiplier for a plurality of chunks of source data comprising:
    generating a representative curve that is associated with encoding a representative chunk included in a plurality of chunks;
    computing a tangent to the representative curve corresponding to a representative encoding bitrate; and
    setting the Lagrangian multiplier equal to a slope of the tangent;
  generate a first curve that specifies different visual quality levels and corresponding encoding bitrates;
  for each chunk included in the plurality of chunks, independently performing one or more optimizations operations based on the Lagrangian multiplier to determine an encoding bitrate, wherein the encoding bitrate is further determined by identifying a first encoding bitrate at which a slope of the first curve equals the Lagrangian multiplier; and
  for each chunk included in the plurality of chunks, causing the chunk to be encoded at the encoding bitrate associated with the chunk.

18. The system of claim 17, wherein the visual quality levels are based on at least one of a Video Multimethod Assessment Fusion, a peak signal-to-noise ratio, and a mean-squared-error.

19. The system of claim 17, wherein the processor is configured to perform the one or more optimization operations for a first chunk included in the plurality of chunks by:
  determining a tangent to the first curve; and
  determining a value for an encoding bitrate that corresponds to the tangent based on the first curve.

20. The system of claim 17, wherein the processor is configured to perform the one or more optimization operations for a first chunk included in the plurality of chunks by:
  computing a derivative of the first curve; and
  determining a value for an encoding bitrate based on the derivative.

* * * * *